(12) United States Patent
Sugano

(10) Patent No.: US 8,795,394 B2
(45) Date of Patent: Aug. 5, 2014

(54) GAS OIL COMPOSITION

(75) Inventor: Hideaki Sugano, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 584 days.

(21) Appl. No.: 12/302,675

(22) PCT Filed: Mar. 9, 2007

(86) PCT No.: PCT/JP2007/055310
§ 371 (c)(1),
(2), (4) Date: Nov. 26, 2008

(87) PCT Pub. No.: WO2007/138776
PCT Pub. Date: Dec. 6, 2007

(65) Prior Publication Data
US 2009/0235575 A1    Sep. 24, 2009

(30) Foreign Application Priority Data

May 31, 2006  (JP) .................................. 2006-152579

(51) Int. Cl.
*C10L 1/16* (2006.01)
*C10L 1/00* (2006.01)

(52) U.S. Cl.
USPC ...... 44/385; 44/308; 585/1; 585/14; 585/240; 585/241; 585/242; 208/14; 208/15; 208/16

(58) Field of Classification Search
USPC ............. 44/628, 308, 385; 208/14–16; 585/1, 585/14, 240–242, 44
See application file for complete search history.

(56) References Cited

U.S. PATENT DOCUMENTS

| | | |
|---|---|---|
| 5,441,072 A | 8/1995 | Indey et al. |
| 6,663,767 B1 | 12/2003 | Berlowitz et al. |
| 2004/0128905 A1 | 7/2004 | Clark et al. |
| 2004/0152930 A1 | 8/2004 | O'Rear et al. |
| 2005/0261144 A1 | 11/2005 | Notari et al. |
| 2009/0126264 A1 | 5/2009 | Hirose et al. |
| 2009/0288336 A1 | 11/2009 | Sugano |

(Continued)

FOREIGN PATENT DOCUMENTS

| | | |
|---|---|---|
| EP | 1116779 A1 | 7/2001 |
| JP | 2003-105354 A | 4/2003 |

(Continued)

OTHER PUBLICATIONS

Notice of Allowance issued Dec. 10, 2010 by the U.S. Patent Office in U.S. Appl. No. 12/294,110.

(Continued)

*Primary Examiner* — Pamela H Weiss
(74) *Attorney, Agent, or Firm* — Panitch Schwarze Belisario & Nadel LLP

(57) ABSTRACT

The present invention provides a gas oil composition for winter use, which can achieve environment load reduction, excellent low-temperature properties and low fuel consumption all together. The gas oil composition comprises on the basis of the total mass thereof, an FT synthetic base oil and/or a hydrotreated animal or vegetable oil with specific characteristics in an amount of 70 percent by volume or more and 98 percent by volume or less, a petroleum base oil with specific characteristics in an amount of 2 percent by volume or more and 30 percent by volume or less and a cold flow improver comprising an ethylene vinyl acetate copolymer and/or a compound with a surface active effect.

2 Claims, 1 Drawing Sheet

(56) References Cited

U.S. PATENT DOCUMENTS

| | | |
|---|---|---|
| 2011/0225877 A1 | 9/2011 | Sugano |
| 2011/0232168 A1 | 9/2011 | Sugano |
| 2012/0023812 A1 | 2/2012 | Sugano |

FOREIGN PATENT DOCUMENTS

| | | | |
|---|---|---|---|
| JP | 2003-531950 A | | 10/2003 |
| JP | 2004-067905 A | | 3/2004 |
| JP | 2005-002229 A | | 1/2005 |
| JP | 2005-529213 A | | 9/2005 |
| JP | 2005-538204 A | | 12/2005 |
| JP | 2006016541 A | * | 1/2006 |
| WO | 01/83648 A2 | | 11/2001 |
| WO | 03/044134 A2 | | 5/2003 |
| WO | 03/091364 A2 | | 11/2003 |
| WO | 03/104361 A2 | | 12/2003 |
| WO | 2004-022674 A1 | | 3/2004 |
| WO | 2004/069964 A2 | | 8/2004 |
| WO | 2005035695 A2 | | 4/2005 |

OTHER PUBLICATIONS

Yooshifumi Suehiro et al.; "IV-B-2 GTL Abura no Upgrading Oyobi Riyo Sokushin Kenkyu"; Gijutsu Center Nenpo; Heisei 15 Nendo; Japan Oil, Gas and Metals National Corp.; 2004 Nen, pp. 116-117.
O'Rear, Dennis J. et al.;"Thermally Stable blends of Fischer Tropsch and LCO Diesel Fuel Components"; Energy and Fuels; vol. 18(3); pp. 682-684; (2004).
Shah, P. P. et al.; "Fischer-tropsch Wax Characterization and Upgrading: Final Report," DOE Report; (1988).
Int'l Search Report issued on Apr. 24, 2007 in Int'l Application No. PCT/JP2007/053860.
Database WPI Week 200609, Thomson Scientific, London (2006) Abstract only.
EP Suppl. Search Report issued Oct. 19, 2010 in EP counterpart Application No. 07 73 8757.
Office Action issued Jul. 12, 2011 in U.S. Appl. No. 12/295,308.
Int'l Search Report issued Jun. 5, 2007 in Int'l Application No. PCT/JP2007/055304.
U.S. Office Action issued Dec. 13, 2011 in U.S. Appl. No. 13/151,380.
U.S. Office Action issued Feb. 10, 2012 in U.S. Appl. No. 13/151,483.
U.S. Appl. No. 13/417,826, filed Mar. 12, 2012.
U.S. Office Action issued Jul. 25, 2012 in U.S. Appl. No. 13/489,571.
Fuels and Lubricants Handbook: Technology Properties Performance and Testing Edited by George E. Totten, Steven R. Vestbrook and Rajesh Shah (2003).
U.S. Office Action issued Aug. 2, 2012 in U.S. Appl. No. 13/269,846.
U.S. Office Action issued Jun. 4, 2012 in U.S. Appl. No. 13/417,826.
U.S. Office Action issued Apr. 8, 2013 in U.S. Appl. No. 13/489,571.
U.S. Office Action issued Apr. 15, 2013 in U.S. Appl. No. 13/269,846.
U.S. Office Action issued Mar. 20, 2012 in U.S. Appl. No. 13/269,846.
U.S. Office Action issued Jan. 2, 2013 in U.S. Appl. No. 13/417,826.

* cited by examiner

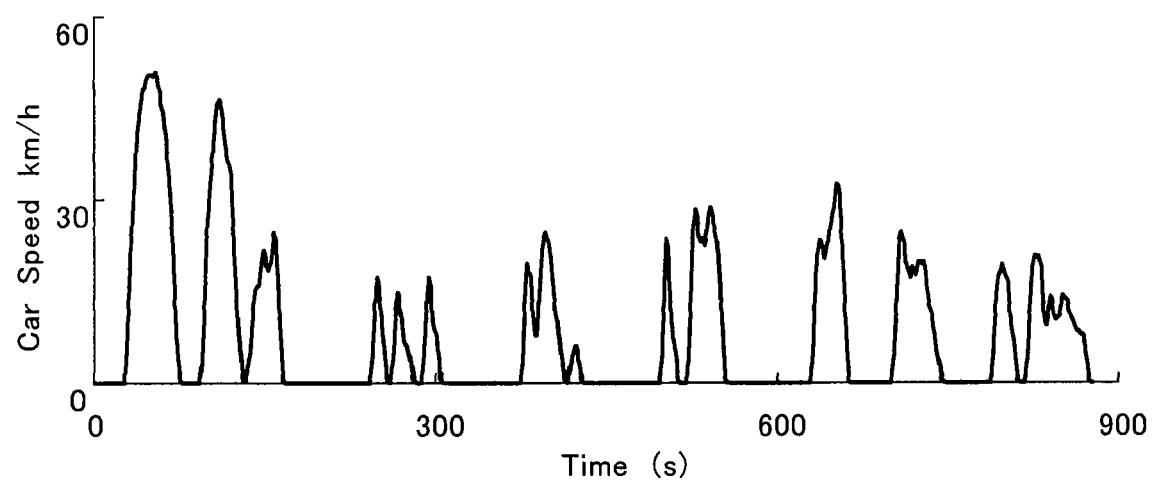

GAS OIL COMPOSITION

FIELD OF THE INVENTION

The present invention relates to gas oil compositions containing mainly an FT synthetic base oil, more particularly to gas oil compositions suitably used in a winter season that can achieve environment load reduction, excellent low temperature properties and low fuel consumption all together.

BACKGROUND OF THE INVENTION

In general, a gas oil composition is produced by blending one or more types of base oils produced by subjecting a straight gas oil or straight kerosene, produced by atmospheric distillation of crude oil to hydrorefining or hydrodesulfurization. In particular, it is often the case that the blend ratio of the foregoing kerosene base oil and gas oil base oil is adjusted in order to ensure the cold flowability during a winter season. If necessary, the base oils are blended with additives such as cetane number improvers, detergents and cold flow improvers (see, for example, Non-Patent Document No. 1 below).

Lower sulfur and aromatic contents are regarded as leading to suppressing of the formation of harmful components such as NOx and PM in the exhaust gas from engines. From the view point of this, attention has been brought to fuels such as liquid fractions corresponding to naphtha, kerosene and gas oil, produced by subjecting a mixed gas containing mainly hydrogen and carbon monoxide produced from natural gas, coal, biomass or sludge (hereinafter may be often referred to as "synthetic gas") to a Fischer-Tropsch (FT) reaction; hydrocarbon mixtures produced by hydrorefining or hydrocracking such liquid fractions; and hydrocarbon mixtures produced by hydrorefining or hydrocracking liquid fractions and FT wax produced through a Fischer-Tropsch reaction, as fuels contributing to environment load reduction.

However, since the FT reaction per se contains a wax formation process, the hydrotreated products of the FT reaction product are relatively large in the content of straight-chain saturated hydrocarbon (normal paraffins) compounds. It has been pointed out that in particular when heavy normal paraffin compounds are contained in the hydrotreated product, there is a possibility that they would deposit in the form of wax. Further, the FT synthetic base oil is a hydrocarbon mixture containing predominantly the aforesaid normal paraffins and saturated hydrocarbons having a side chain (isoparaffin) and thus is generally poor in oil solubility. Therefore, there is a possibility that additives that are dissolved in fuel oils such as gas oil, highly relying on their oil soluble groups (straight-chain alkyl groups or the like) would be hardly dissolved. Among such additives, there would be likely used conventional cold flow improvers (CFI) composed of an ethylene-vinyl acetate copolymer mixture due to the restriction on the solubility to fuel.

Patent Document No. 1 discloses in an example thereof a synthetic fuel containing only a gas oil fraction produced from an FT synthetic base oil. However, this gas oil is an extremely light fuel containing a kerosene fraction in a large amount because the document intends to solve a problem concerning low-temperature startability and thus a technique for improving low-temperature properties with a cold flow improver can not be selected. As the result, significant reductions in density, kinematic viscosity and volume calorific value can not be avoided, and furthermore it can not be denied that the reductions would result in significant deterioration in fuel consumption, seizure of injection pumps, cavitation damages and defects in high-temperature restartability.

That is, it is very difficult to design a high-quality fuel that can achieve at a high level the requirements sought for a gas oil composition having environment load reduction properties, excellent practical performances in a winter season and suppression of fuel consumption deterioration all together, and there exists no example or finding on the basis of studies of such a fuel satisfying sufficiently various properties required for fuel other than the foregoing and a practical process for producing the fuel.

(1) Patent Document No. 1: Japanese Patent Laid-Open Publication No. 2005-529213

(2) Non-Patent Document No. 1: Konishi Seiichi, "Nenryo Kogaku Gairon", Shokabo Publishing Co., Ltd., March, 1991, pages 136 to 144

DISCLOSURE OF THE INVENTION

The present invention was made in view of the above-described situations and has an object to provide a gas oil composition containing mainly an FT synthetic base oil, more specifically such a gas oil composition that can achieve environment load reduction, excellent low temperature properties and low fuel consumption all together and is suitably used in a winter season. The present invention was completed as the result of extensive study and research carried out by the present inventor to solve the foregoing problems.

That is, the present invention relates to a gas oil composition comprising on the basis of the total mass of the composition:

an FT synthetic base oil and/or a hydrotreated animal or vegetable oil in an amount of 70 percent by volume or more to 98 percent by volume or less;

a petroleum base oil in an amount of 2 percent by volume or more to 30 percent by volume or less; and a cold flow improver comprising an ethylene vinyl acetate copolymer and/or a compound with a surface active effect in an amount of 20 mg/L or more and 1000 mg/L or lower in terms of active component, the FT synthetic base oil and/or the hydrotreated animal or vegetable oil, having a 10% distillation temperature of 160° C. or higher and 230° C. or lower, a 90% distillation temperature of 280° C. or higher and 340° C. or lower and an end point of 360° C. or lower in distillation characteristics, an higher aliphatic alcohol content of 100 ppm by mass or less, a sulfur content of 1 ppm by mass or less and a total content of normal paraffins having 20 to 30 carbon atoms of less than 8 percent by mass;

the petroleum base oil having a 10% distillation temperature of 150° C. or higher and 250° C. or lower, a 90% distillation temperature of 210° C. or higher and 355° C. or lower and an end point of 365° C. or lower in distillation characteristics, a sulfur content of 10 ppm by mass or less, a total content of normal paraffins having 20 to 30 carbon atoms of less than 6 percent by mass, an aromatic content of 10 percent by volume or more and 60 percent by volume or less and a naphthene content of 10 percent by volume or more and 60 percent by volume or less;

the composition having a cloud point of −3° C. or lower, a cold filter plugging point of −10° C. or lower, a value obtained by deducting the cold filter plugging point from the cloud point of 3° C. or higher, a pour point of −12.5° C. or lower, a solubility index of 0 or greater, an aromatic content of 1 percent by volume or more and 15 percent by volume or less, a cetane number of 50 or greater and 80 or less, and an HFRR wear scar diameter (WS1.4) of 400 μm or smaller.

Preferably, the gas oil composition of the present invention has a density at 15° C. of 760 kg/m³ or greater and 840 kg/m³ or less, a 90% distillation temperature of 280° C. or higher and 350° C. or lower, a kinematic viscosity at 30° C. of 2.5 mm$^2$/s or greater and 5.0 mm$^2$/s or less, and a water content of 100 ppm by volume or less.

The intentions of the present invention are as follows. A fuel would be adversely affected if it is produced by a process wherein the wax content is extremely reduced by excessive lightening, and a fuel of low oil solubility, which is produced solely from an FT synthetic base oil and/or a hydrotreated oil of an animal or vegetable oil would hardly dissolve additives, resulting in a possibility that the additives would fail to exhibit their original advantageous effects. Therefore, the present invention is intended to create and propose a quality design method required for imparting a fuel reduced in oil solubility with an effect to improve cold flowability resulting from addition of additives such as CFI, by applying base oils with specific characteristics to the fuel to retrieve the oil solubility.

Effects of the Invention

According to the present invention, the use of a gas oil composition produced by the above-described process to satisfy the above-described requirements regarding fractions and the like renders it possible to produce easily a gas oil composition suitable for a winter season that can achieve environment load reduction, excellent low-temperature properties and low fuel consumption all together, which have been difficult to achieve with the conventional gas oil compositions.

BEST MODE FOR CARRYING OUT THE INVENTION

The present invention will be described in more detail below.

The gas oil composition of the present invention necessarily contains an FT synthetic base oil and/or a hydrotreated animal or vegetable oil, having specific characteristics. The FT synthetic base oil and/or the hydrotreated animal or vegetable oil are composed of saturated hydrocarbon compounds, and the gas oil composition of the present invention can be easily produced by adjusting the blend of the hydrocarbon compounds.

The FT synthetic base oil referred herein denotes various synthetic oils such as liquid fractions corresponding to naphtha, kerosene and gas oil, produced by subjecting a mixed gas containing mainly hydrogen and carbon monoxide (hereinafter may be often referred to as "synthetic gas") to a Fischer-Tropsch (FT) reaction; hydrocarbon mixtures produced by hydrorefining or hydrocracking such liquid fractions; and hydrocarbon mixtures produced by hydrorefining or hydrocracking liquid fractions and FT wax, produced through a Fischer-Tropsch reaction.

The mixed gas which will be the feedstock of the FT synthetic oil is produced by oxidizing a substance containing carbon using oxygen and/or water and/or carbon dioxide as an oxidizing agent and further if necessary by a shift reaction using water so as to be adjusted in predetermined hydrogen and carbon monoxide concentrations.

Substances containing carbon which may be used herein are generally gas components composed of hydrocarbons that are gas in normal temperatures such as natural gas, liquefied petroleum gas, and methane gas, petroleum asphalt, biomass, coke, wastes such as building materials and garbage, sludge, heavy crude oils that are difficult to be disposed in the usual manner, and mixed gas produced by exposing unconventional petroleum resources to elevated temperatures. However, in the present invention, there is no particular restriction on the feedstock as long as a mixed gas containing mainly hydrogen and carbon monoxide can be produced.

The Fischer-Tropsch reaction requires a metal catalyst. It is preferable to use metals in Group 8 of the periodic table, such as cobalt, ruthenium, rhodium, palladium, nickel and iron, more preferably metals in Group 8, Period 4, as an active catalyst component. Alternatively, there may be used a mixed metal group containing these metals in suitable amounts. These active metals are generally used in the form of a catalyst produced by supporting them on a support such as alumina, titania and silica-alumina. Alternatively, the use of the forgoing active metals in combination with a second metal can improve the performances of the resulting catalyst. Examples of the second metal include alkali or alkaline earth metals such as sodium, lithium and magnesium, zirconium, hafnium and titanium, which will be used depending on purposes such as increase in conversion rate of carbon monoxide or chain growth probability ($\alpha$) which is an index of the production amount of wax.

The Fischer-Tropsch reaction is a synthetic method for producing liquid fractions and FT wax using a mixed gas as the feedstock. It is generally preferable to adjust the ratio of hydrogen to carbon monoxide in the mixed gas in order to carry out the synthetic method efficiently. In general, the molar mix ratio of hydrogen to carbon monoxide (hydrogen/carbon monoxide) is preferably 1.2 or greater, more preferably 1.5 or greater, more preferably 1.8 or greater. The ratio is also preferably 3 or less, more preferably 2.6 or less, more preferably 2.2 or less.

The reaction temperature at which the Fischer-Tropsch reaction is carried out using the foregoing catalyst is preferably 180° C. or higher and 320° C. or lower, more preferably 200° C. or higher and 300° C. or lower. At a reaction temperature of lower than 180° C., carbon monoxide hardly reacts, resulting in a tendency that the hydrocarbon yield is reduced. At a reaction temperature of higher than 320° C., gas such as methane is increasingly formed, resulting in a reduction in the production efficiency of liquid fractions and FT wax.

There is no particular restriction on the gas hourly space velocity with respect to the catalyst. However, it is preferably 500 h$^{-1}$ or more and 4000 h$^{-1}$ or lower, more preferably 1000 h$^{-1}$ or more and 3000 h$^{-1}$ or lower. A gas hourly space velocity of less than 500 h$^{-1}$ is likely to reduce the production of the liquid fuel while a gas hourly space velocity of more than 400 h$^{-1}$ causes a necessity to increase the reaction temperature and increase the amount of gas to be produced, resulting in a reduction in the yield of the intended product.

There is no particular restriction on the reaction pressure (partial pressure of a synthetic gas composed of carbon monoxide and hydrogen). However, it is preferably 0.5 MPa or greater and 7 MPa or smaller, more preferably 2 MPa or greater and 4 MPa or smaller. If the reaction pressure is smaller than 0.5 MPa, the yield of liquid fuel would tend to decrease. If the reaction pressure is greater than 7 MPa, it is not economically advantageous because the amount of capital investment in facilities would be increased.

Liquid fractions and FT wax produced through the above-described FT reaction may be hydrorefined or hydrocracked in any suitable manner so as to be adjusted in distillation characteristics or formulation to achieve the purposes of the invention. Hydrorefining or hydrocracking may be selected depending on the purposes and the present invention is not limited in selection to either one or both of them to such an extent that the gas oil composition of the present invention is produced.

Catalysts used for hydrorefining are generally those comprising a hydrogenation active metal supported on a porous support, but the present invention is not limited thereto as long as the same effects are obtained.

The porous support is preferably an inorganic oxide. Specific examples include alumina, titania, zirconia, boria, silica, zeolite and the like.

Zeolite is crystalline aluminosilicate, examples of which include faujasite, pentasil and mordenite type zeolites. Preferred are faujasite, beta and mordenite type zeolites and particularly preferred are Y-type and beta-type zeolites. Y-type zeolites are preferably ultra stable.

Preferred for the active metal are those of the following two types (active metal A type and active metal B type).

The active metal A type is at least one type of metal selected from the group consisting of those in Group 8 of the periodic table. It is preferably at least one type selected from the group consisting of Ru, Rh, Ir, Pd and Pt, and is more preferably Pd and/or Pt. The active metal may be a combination of these metals, such as Pt—Pd, Pt—Rh, Pt—Ru, Ir—Pd, Ir—Rh, Ir—Ru, Pt—Pd—Rh, Pt—Rh—Ru, Ir—Pd—Rh, and Ir—Rh—Ru. A noble metal catalyst formed of these metals can be used after being subjected to a pre-reduction treatment under hydrogen flow. In general, the catalyst is heated at a temperature of 200° C. or higher in accordance with predetermined procedures, circulating a gas containing hydrogen so that the active metal on the catalyst is reduced and thus exhibits hydrogenation activity.

The active metal B type contains preferably at least one type of metal selected from the group consisting of those in Groups 6A and 8 of the periodic table, desirously two or more types of metals selected therefrom. Examples of these metals include Co—Mo, Ni—Mo, Ni—Co—Mo and Ni—W. When a metal sulfide catalyst formed of these metals is used, it must undergo a pre-sulfurization process.

The metal source may be a conventional inorganic salt or complex salt compound. The supporting method may be any supporting method that has been usually used for hydrogenation catalysts, such as impregnation and ion-exchange methods. When a plurality of metals are supported, they may be supported simultaneously using a mixed solution thereof or sequentially using a single solution containing each metal. The metal solution may be an aqueous solution or a solution using an organic solvent.

The reaction temperature at which hydrorefining is carried out using a catalyst composed of the active metal A type is preferably 180° C. or higher and 400° C. or lower, more preferably 200° C. or higher and 370° C. or lower, more preferably 250° C. or higher and 350° C. or lower, more preferably 280° C. or higher and 350° C. or lower. A reaction temperature of higher than 370° C. is not preferable because the yield of the middle fraction is extremely reduced, resulting from an increase in a side reaction wherein the liquid fraction or FT wax is cracked to a naphtha fraction. A reaction temperature of lower than 180° C. is not also preferable because alcohols can not be removed and thus remains in the reaction system.

The reaction temperature at which hydrorefining is carried out using a catalyst composed of the active metal B type is preferably 170° C. or higher and 320° C. or lower, more preferably 175° C. or higher and 300° C. or lower, more preferably 180° C. or higher and 280° C. or lower. A reaction temperature of higher than 320° C. is not preferable because the yield of the middle fraction is reduced, resulting from an increase in a side reaction wherein the liquid fraction or FT wax is cracked to a naphtha fraction. A reaction temperature of lower than 170° C. is not also preferable because alcohols can not be removed and thus remains in the reaction system.

The hydrogen pressure at which hydrorefining is carried out using a catalyst composed of the active metal A type is preferably 0.5 MPa or greater and 12 MPa or less, more preferably 1.0 MPa or greater and 5.0 MPa or less. Although a higher hydrogen pressure facilitates the hydrogenation reaction, there is generally an optimum point in economical sense.

The hydrogen pressure at which hydrorefining is carried out using a catalyst composed of the active metal B type is preferably 2 MPa or greater and 10 MPa or less, more preferably 2.5 MPa or greater and 8 MPa or less, more preferably 3 MPa or greater and 7 MPa or less. Although a higher hydrogen pressure facilitates the hydrogenation reaction, there is generally an optimum point in economical sense.

The liquid hourly space velocity (LHSV) at which hydrorefining is carried out using a catalyst composed of the active metal A type is preferably $0.1\ h^{-1}$ or greater and $10.0\ h^{-1}$ or less, more preferably $0.3\ h^{-1}$ or greater and $3.5\ h^{-1}$ or less. Although a lower LHSV is advantageous for the reaction, a too low LHSV is not economically preferable because it requires an extremely large reactor volume, leading to an excessive capital investment in facilities.

The liquid hourly space velocity (LHSV) at which hydrorefining is carried out using a catalyst composed of the active metal B type is preferably $0.1\ h^{-1}$ or greater and $2\ h^{-1}$ or less, more preferably $0.2\ h^{-1}$ or greater and $1.5\ h^{-1}$ or less, more preferably $0.3\ h^{-1}$ or greater and $1.2\ h^{-1}$ or less. Although a lower LHSV is advantageous for the reaction, a too low LHSV is not economically preferable because it requires an extremely large reactor volume, leading to an excessive capital investment in facilities.

The hydrogen/oil ratio at which hydrorefining is carried out using a catalyst composed of the active metal A type is preferably 50 NL/L or greater and 1000 NL/L or less, more preferably 70 NL/L or greater and 800 NL/L or less. Although a higher hydrogen/oil ratio facilitates the reaction, there is generally an optimum point in economical sense.

The hydrogen/oil ratio at which hydrorefining is carried out using a catalyst composed of the active metal B type is preferably 100 NL/L or greater and 800 NL/L or less, more preferably 120 NL/L or greater and 600 NL/L or less, more preferably 150 NL/L or greater and 500 NL/L or less. Although a higher hydrogen/oil ratio facilitates the reaction, there is generally an optimum point in economical sense.

Catalysts used for hydrocracking are generally those comprising a hydrogenation active metal supported on a support with solid acidic properties, but the present invention is not limited thereto as long as the same effects are obtained.

As for the support with solid acidic properties, there are amorphous and crystalline zeolite types. Specific examples include silica-alumina, silica-magnesia, silica-zirconia and silica-titania, which are of amorphous type and zeolites of faujasite, beta, MFI and mordenite types, preferably Y type and beta type. The Y type zeolites are preferably are ultra-stabilized.

Preferred for the active metal are those of the following two types (active metal A type and active metal B type).

The active metal A type is at least one type of metal mainly selected from the group consisting of those in Groups 6A and 8 of the periodic table. It is preferably at least one type of metal selected from the group consisting of Ni, Co, Mo, Pt, Pd and W. A noble metal catalyst formed of these metals can be used after being subjected to a pre-reduction treatment under hydrogen flow. In general, the catalyst is heated at a temperature of 200° C. or higher in accordance with predetermined procedures, circulating a gas containing hydrogen so that the active metal on the catalyst is reduced and thus exhibits hydrogenation activity.

The active metal B type may be a combination of these metals, such as Pt—Pd, Co—Mo, Ni—Mo, Ni—W, and Ni—Co—Mo. When a catalyst formed of these metals is used, it is preferably used after being subjected to a pre-sulfurization process before use.

The metal source may be a conventional inorganic salt or complex salt compound. The supporting method may be any supporting method that has been usually used for hydrogenation catalysts, such as impregnation and ion-exchange methods. When a plurality of metals are supported, they may be supported simultaneously using a mixed solution thereof or sequentially using a single solution containing each metal. The metal solution may be an aqueous solution or a solution with an organic solvent.

The reaction temperature at which hydrocracking is carried out using a catalyst composed of the active metal type A and active metal type B is preferably 200° C. or higher and 450° C. or lower, more preferably 250° C. or higher and 430° C. or lower, more preferably 300° C. or higher and 400° C. or lower. A reaction temperature of higher than 450° C. is not preferable because the yield of the middle fraction is extremely reduced, resulting from an increase in a side reaction wherein the liquid fraction or FT wax is cracked to a naphtha fraction. A reaction temperature of lower than 200° C. is not also preferable because the activity of the catalyst is extremely reduced.

The hydrogen pressure at which hydrocracking is carried out using a catalyst composed of the active metal type A and active metal type B is preferably 1 MPa or greater and 20 MPa or less, more preferably 4 MPa or greater and 16 MPa or less, more preferably 6 MPa or greater and 13 MPa or less. Although a higher hydrogen pressure facilitates the hydrogenation reaction, the cracking reaction would rather proceed slowly and thus needs to be adjusted in the proceeding thereof by increasing the reaction temperature, leading to a short working life of the catalyst. Therefore, there is generally an optimum point in economical sense.

The liquid hourly space velocity (LHSV) at which hydrocracking is carried out using a catalyst composed of the active metal A type is preferably 0.1 $h^{-1}$ or greater and 10.0 $h^{-1}$ or less, more preferably 0.3 $h^{-1}$ or greater and 3.5 $h^{-1}$ or less. Although a lower LHSV is advantageous for the reaction, a too low LHSV is not economically preferable because it requires an extremely large reactor volume, resulting in an excessive capital investment in facilities.

The liquid hourly space velocity (LHSV) at which hydrocracking is carried out using a catalyst composed of the active metal B type is preferably 0.1 $h^{-1}$ or greater and 2 $h^{-1}$ or less, more preferably 0.2 $h^{-1}$ or greater and 1.7 $h^{-1}$ or less, more preferably 0.3 $h^{-1}$ or greater and 1.5 $h^{-1}$ or less. Although a lower LHSV is advantageous for the reaction, a too low LHSV is not economically preferable because it requires an extremely large reactor volume, resulting in an excessive capital investment in facilities.

The hydrogen/oil ratio at which hydrocracking is carried out using a catalyst composed of the active metal A type is preferably 50 NL/L or greater and 1000 NL/L or less, more preferably 70 NL/L or greater and 800 NL/L or less, more preferably 400 NL/L or greater and 1500 NL/L or less. Although a higher hydrogen/oil ratio facilitates the reaction, there is generally an optimum point in economical sense.

The hydrogen/oil ratio at which hydrocracking is carried out using a catalyst composed of the active metal B type is preferably 150 NL/L or greater and 2000 NL/L or less, more preferably 300 NL/L or greater and 1700 NL/L or less, more preferably 400 NL/L or greater and 1500 NL/L or less. Although a higher hydrogen/oil ratio facilitates the reaction, there is generally an optimum point in economical sense.

The reactor for hydrogenation may be of any structure and a single or a plurality of reaction tower may be used. Hydrogen may be additionally supplied between a plurality of reaction towers. The reactor may have a facility for removing sulfurized hydrogen and a distillation tower for fractionally distilling hydrogenated products for producing desired fractions.

The reaction mode of the hydrogenation reactor may be a fixed bed mode. Hydrogen may be supplied to the feedstock in a counter or parallel flow mode. Alternatively, the reaction mode may be a combination of counter and parallel flow modes, with a plurality of reaction towers. The supply mode of the feedstock is generally down flow and is preferably a gas-liquid cocurrent flow mode. Hydrogen gas may be supplied as quencher into a middle portion of a reactor for the purposes of removing the reaction heat or increasing the hydrogen partial pressure.

The gas oil composition of the present invention may contain a hydrotreated animal or vegetable oil having the equivalent characteristics to those of the FT synthetic oil.

The hydrotreated animal or vegetable oil is a base oil mainly composed of chain saturated hydrocarbons, produced by applying a chemical reaction treatment used upon production of a petroleum base oil, to an oil or fat produced from an animal or vegetable-based raw material. More specifically, the hydrotreated animal or vegetable oil is a hydrocarbon-containing mix base oil produced by bringing under hydrogen pressure a feedstock which is a hydrocarbon fraction containing an animal or vegetable fat and a component originating therefrom, into contact with a catalyst comprising at least one or more types of metals selected from the Groups 6A and 8 of the periodic table and an inorganic oxide with acidic properties. The feedstock of the hydrotreated animal or vegetable oil is necessarily an animal or vegetable fat or a component originating therefrom. Examples of the animal or vegetable fat or the component originating therefrom used herein include natural or artificially made or produced animal or vegetable fats. Examples of raw materials of the animal fats and animal oils include beef tallow, milk fat (butter), lard, mutton tallow, whale oil, fish oil, and liver oil. Examples of raw materials of the vegetable fats and vegetable oils include the seeds and other parts of coconut, palm tree, olive, safflower, rape (rape blossoms), rice bran, sunflower, cotton seed, corn, soy bean, sesame, flaxseed, and Jatropha. The use of fats and oil other than these would not create any problem. The feedstocks may be of solid or liquid but are preferably produced from vegetable fats or vegetable oils with the objective of easy handling, carbon dioxide absorptivity, and high productivity. Alternatively, waste oils resulting from the use of these animal and vegetable oils for household, industry and food preparation purposes may be used as the feedstock after the residual matters are removed from these oils.

Examples of the typical composition of the fatty acid part of the glyceride compounds contained in these feedstocks include fatty acids, so-called saturated fatty acids having no unsaturated bond in the molecules, such as butyric acid ($C_3H_7COOH$), caproic acid ($C_5H_{11}COOH$), caprylic acid ($C_7H_{15}COOH$), capric acid ($C_9H_{19}COOH$), lauric acid ($C_{11}H_{23}COOH$), myristic acid ($C_{13}H_{27}COOH$), palmitic acid ($C_{15}H_{31}COOH$), stearic acid ($C_{17}H_{35}COOH$), and so-called unsaturated fatty acids having one or more unsaturated bonds in the molecules, such as oleic acid ($C_{17}H_{33}COOH$), linoleic acid ($C_{17}H_{31}COOH$), linolenic acid ($C_{17}H_{29}COOH$) and ricinoleic acid ($C_{17}H_{32}(OH)COOH$). In general, the hydrocarbon parts of these fatty acids contained in substances existing in nature are mostly of straight chain. However, the fatty acid may be any of those having a side chain structure, i.e., isomers as long as the properties defined by the present invention are satisfied. The unsaturated fatty acid may be any of those existence of which are generally recognized in nature as well as those having an unsaturated bond per molecule, the position of which is adjusted through chemical synthesis as long as the properties defined by the present invention are satisfied.

The above-described feedstocks (animal or vegetable fats and components originating therefrom) contain one or more of these fatty acids, which vary depending on the raw materials. For example, coconuts oil contains a relatively large amount of saturated fatty acid groups such as lauric acid and myristic acid groups while soy bean oil contains a large amount of unsaturated fatty acid groups such as oleic acid and linoleic acid groups.

The feedstock contains preferably a fraction whose boiling point is 250° C. or higher, more preferably a fraction whose boiling point is 300° C. or higher, more preferably a fraction whose boiling point is 360° C. or higher. If the feedstock contains no fraction whose boiling point is 250° C. or higher, the yield of a liquid product would be decreased due to an increase in gas formed during the production, possibly resulting in an increase in life cycle carbon dioxide.

Alternatively, the feedstock of the hydrotreated animal or vegetable oil may be a mixture of an animal or vegetable fat and a component originating therefrom, and a petroleum hydrocarbon fraction. When the feedstock is such a mixture, the ratio of the petroleum hydrocarbon fraction is preferably from 10 to 99 percent by volume, more preferably from 30 to 99 percent by volume, more preferably from 60 to 98 percent by volume, of the total volume of the feedstock. If the ratio is less than the lower limit, there may arise the necessity of facilities for disposal of by-produced water. If the ratio exceeds the upper limit, it is not preferable in view of life cycle carbon dioxide reduction.

Hydrotreating of the feedstock are carried out preferably under conditions where the hydrogen pressure is in the range of 6 to 20 MPa, the liquid hourly space velocity (LHSV) is in the range of 0.1 to 1.5 $h^{-1}$, the hydrogen/oil ratio is in the range of 200 to 2000 NL/L, and the reaction temperature is in the range of 180 to 440° C., more preferably under conditions where the hydrogen pressure is in the range of 8 to 17 MPa, the liquid hourly space velocity is in the range of 0.2 to 1.1 $h^{-1}$, and the hydrogen/oil ratio is in the range of 300 to 1800 NL/L, and the reaction temperature is in the range of 200 to 420° C., more preferably under conditions where the hydrogen pressure is in the range of 10 to 16 MPa, the liquid hourly space velocity is in the range of 0.3 to 0.9 $h^{-1}$, and the hydrogen/oil ratio is in the range of 350 to 1600 NL/l, and the reaction temperature is in the range of 220 to 400° C. Each of the conditions is a factor exerting an influence on the reaction activity. For example, if the hydrogen pressure and hydrogen/oil ratio are less than the lower limits, the reactivity tends to reduce, and the activity tends to reduce rapidly. If the hydrogen pressure and hydrogen/oil ratio exceed the upper limits, an enormous plant investment for a compressor may be required. Lower liquid hourly space velocity tends to be more advantageous for the reactions. However, if the liquid hourly space velocity is lower than 0.1 $h^{-1}$, an enormous plant investment for construction of a reactor with an extremely large volume may be required. If the liquid hourly space velocity exceeds 1.5 $h^{-1}$, the reaction tends to proceed insufficiently.

The gas oil composition of the present invention contains an FT synthetic base oil and/or a hydrotreated oil of an animal or vegetable oil having specific characteristics in an amount of necessarily 70 percent by volume or more, preferably 72 percent by volume or more, more preferably 75 percent by volume or more, on the basis of the total mass of the composition in order to reduce harmful substances such as PM and unburnt hydrocarbons. Further, the gas oil composition contains the foregoing FT synthetic base oil and/or hydrotreated animal or vegetable oil in an amount of necessarily 98 percent by volume or less, preferably 97 percent by volume or less, more preferably 95 percent by volume or less, on the basis of the total mass of the composition in order to enhance the oil solubility of the composition.

The FT synthetic base oil and/or the hydrotreated animal or vegetable oil to be contained in the gas oil composition has necessarily a 10% distillation temperature of 160° C. or higher and 230° C. or lower, a 90% distillation temperature of 280° C. or higher and 340° C. or lower and an end point of 360° C. or lower in distillation characteristics, an higher aliphatic alcohol content of 100 ppm by mass or less, a sulfur content of 1 ppm by mass or less and a total content of normal paraffins having 20 to 30 carbon atoms of less than 8 percent by mass.

The FT synthetic base oil and/or the hydrotreated animal or vegetable oil to be contained in the gas oil composition may be used alone or a mixture of two or more types of these oils as long as they have the specific characteristics defined by the present invention.

If the FT synthetic base oil and/or the hydrotreated animal or vegetable oil to be contained in the gas oil composition have distillation characteristics, a higher aliphatic alcohol content, a sulfur content, or a total content of normal paraffins having 20 to 30 carbon atoms, deviating from the above-described ranges, the resulting composition would fail to achieve environment load reduction, excellent low temperature properties and low fuel consumption all together. Therefore, the FT synthetic base oil and/or the hydrotreated animal or vegetable oil has preferably a 10% distillation temperature of 165° C. or higher and 225° C. or lower, a 90% distillation temperature of 285° C. or higher and 335° C. or lower and an end point of 358° C. or lower in distillation characteristics, an higher aliphatic alcohol content of 80 ppm by mass or less, and a total content of normal paraffins having 20 to 30 carbon atoms of 7.5 percent by mass or less, more preferably a 10% distillation temperature of 170° C. or higher and 220° C. or lower, a 90% distillation temperature of 290° C. or higher and 330° C. or lower and an end point of 355° C. or lower in distillation characteristics, an higher aliphatic alcohol content of 60 ppm by mass or less, and a total content of normal paraffins having 20 to 30 carbon atoms of 7.0 percent by mass or less.

The 10% distillation temperature, 90% distillation temperature and end point used herein denote the values measured in accordance with JIS K 2254 "Petroleum products-Determination of distillation characteristics". The higher aliphatic alcohol content used herein denotes the content of thereof on the basis of the total mass of the base oil, measured by gas chromatography using a polarity column under the conditions set forth in Table 1 below. The total content of normal paraffins having 20 to 30 carbon atoms (mass %) used herein denotes the value (mass %) measured with GC-FID, indicating the ratio of the total peak area of each of normal paraffins having 20 to 30 carbon atoms to the total peak area measured using GC-FID wherein the column is a capillary column formed of methyl silicone (ULTRA ALLOY-1), the carrier gas is helium and the detector is a flame ionization detector (FID), under conditions wherein the column length is 30 m, the carrier gas flow rate is 1.0 mL/min, the ratio of division is 1:79, the sample injection temperature is 360° C., the column is heated up from 140° C. to 355° C. (8° C./min), and the detector temperature is 360° C.

The gas oil composition of the present invention contains necessarily a petroleum base oil with the specific characteristics described below, in an amount of 2 percent by volume or more, preferably 4 percent by volume or more, more preferably 5 percent by volume or more, in order to enhance the oil solubility of the composition. Further, the gas oil composition contains necessarily such a petroleum base oil in an amount of 30 percent by volume or less, preferably 27 percent by volume or less, more preferably 25 percent by volume or less in order to reduce harmful substances such as PM and unburnt hydrocarbons.

The petroleum base oil contained in the gas oil composition is a hydrocarbon base oil produced by processing crude oil. Examples include straight base oils produced through an atmospheric distillation unit; vacuum base oils produced by processing straight heavy oil or residue produced through an atmospheric distillation unit, in a vacuum distillation unit; catalytically cracked or hydrocracked base oils produced by catalytically cracking or hydrocracking vacuum heavy base oil or desulfurized fuel oil; and hydrorefined or hydrodesulfurized base oils produced by hydrorefining any of these petroleum hydrocarbons. Alternatively, other than crude oil, base oils produced by subjecting to resources referred to as unconventional petroleum resources, such as oil shale, oil sand and Orinoco tar to suitable processing to have properties equivalent to those of the foregoing base oils may be used as the base oil in the present invention.

When the feedstock is a gas oil fraction, conditions for hydrorefining may be those determined when a hydrodesulfurizing unit is generally used for petroleum refining. Generally, hydrorefining of a gas oil fraction is carried out under conditions where the reaction temperature is from 300 to 380° C., the hydrogen pressure is from 3 to 8 MPa, the LHSV is from 0.3 to 2 h$^{-1}$, and the hydrogen/oil ratio is from 100 to 500 NL/L. When the feedstock is a kerosene fraction, conditions for hydrorefining may be those determined when a hydrodesulfurizing unit is generally used for petroleum refining. Generally, hydrorefining of a kerosene fraction is carried out under conditions where the reaction temperature is from 220 to 350° C., the hydrogen pressure is from 1 to 6 MPa, the LHSV is from 0.1 to 10 h$^{-1}$, and the hydrogen/oil ratio is from 10 to 300 NL/L, preferably conditions where the reaction temperature is from 250 to 340° C., the hydrogen pressure is from 2 to 5 MPa, the LHSV is from 1 to 10 h$^{-1}$, and the hydrogen/oil ratio is from 30 to 200 NL/L, more preferably under conditions where the reaction temperature is from 270 to 330° C., the hydrogen pressure is from 2 to 4 MPa, the LHSV is from 2 to 10 h$^{-1}$, and the hydrogen/oil ratio is from 50 to 200 NL/L.

A lower reaction temperature is advantageous for hydrogenation reaction but is not preferable for desulfurization reaction. A higher hydrogen pressure and a higher hydrogen/oil ratio facilitate desulfurization and hydrogenation reactions but there is an optimum point in economical sense. Although a lower LHSV is advantageous for the reaction, a too low LHSV is not economically preferable because it requires an extremely large reactor volume, resulting in an excessive capital investment in facilities.

A catalyst used for the hydrorefining may be any of the conventional hydrodesulfurization catalysts. Examples of the active metals of the catalyst include sulfides of the Groups 6A and 8 metals of the periodic table. Examples of these metals include Co—Mo, Ni—Mo, Co—W, and Ni—W. The support may be an porous inorganic oxide containing alumina as the main component. These conditions and the catalyst are not particularly restricted as long as the characteristics of the feedstock are satisfied.

The petroleum base oil contained in the gas oil composition of the present invention may be a highly hydrotreated kerosene or gas oil fraction produced by further hydrotreating a specific feedstock having been hydrotreated. Examples of the feedstock include straight kerosene or gas oils produced through an atmospheric distillation unit for crude oil; vacuum kerosene or gas oils produced by processing straight heavy oil or residue produced through an atmospheric distillation unit, in a vacuum distillation unit; and hydrorefined and hydrodesulfurized kerosene or gas oils produced by hydrotreating catalytically cracked kerosene or gas oils produced by catalytically cracking desulfurized or undesulfurized vacuum kerosene or gas oils, vacuum heavy gas oil or desulfurized fuel oil.

The highly hydrotreated base oil is produced by hydrotreating the above-described hydrorefined kerosene or gas oil as the feedstock in the presence of a hydrogenation catalyst.

Conditions for the highly hydrogenation are those where the reaction temperature is from 170 to 320° C., the hydrogen pressure is from 2 to 10 MPa, the LHSV is from 0.1 to 2 h$^{-1}$, and the hydrogen/oil ratio is from 100 to 800 NL/L, preferably conditions where the reaction temperature is from 175 to 300° C., the hydrogen pressure is from 2.5 to 8 MPa, the LHSV is from 0.2 to 1.5 h$^{-1}$, and the hydrogen/oil ratio is from 150 to 600 NL/L, more preferably under conditions where the reaction temperature is from 180 to 280° C., the hydrogen pressure is from 3 to 7 MPa, the LHSV is from 0.3 to 1.2 h$^{-1}$, and the hydrogen/oil ratio is from 150 to 500 NL/L. A lower reaction temperature is advantageous for hydrogenation reaction but is not preferable for desulfurization reaction. A higher hydrogen pressure and a higher hydrogen/oil ratio facilitate desulfurization and hydrogenation reactions but there is an optimum point in economical sense. Although a lower LHSV is advantageous for the reaction, a too low LHSV is not economically preferable because it requires an extremely large reactor volume, leading to an excessive capital investment in facilities.

A unit for hydrotreating the feedstock having been hydrorefined may be of any structure, and a single or a plurality of reactors in combination may be used. Hydrogen may be additionally introduced into the spaces between a plurality of reactors. The hydrorefining unit may be provided with a gas-liquid separation system or a hydrogen sulfide removal system.

The reaction mode of the hydrogenation reactor may be a fixed bed mode. Hydrogen may be supplied to the feedstock in a counter or parallel flow mode. Alternatively, the reaction mode may be a combination of counter and parallel flow modes, with a plurality of reaction towers. The supply mode of the feedstock is generally down flow and is preferably a gas-liquid cocurrent flow mode. Hydrogen gas may be supplied as quencher into a middle portion of a reactor for the purposes of removing the reaction heat or increasing the hydrogen partial pressure.

A catalyst used for hydrotreating comprises a hydrogenation active metal supported on a porous support. The porous support may be an inorganic oxide such as alumina. Examples of the inorganic oxide include alumina, titania, zirconia, boria, silica, and zeolite. In the present invention, the support is preferably composed of alumina and at least one selected from titania, zirconia, boria, silica, and zeolite. There is no particular restriction on the method of producing the support. Therefore, there may be employed any method using raw materials in the form of sols or salt compounds each containing any of the elements. Alternatively, the support may be prepared by forming a complex hydroxide or oxide such as silica alumina, silica zirconia, alumina titania, silica titania, and alumina boria and then adding at any step alumina in the form of alumina gel, a hydroxide, or a suitable solution. Alumina can be contained in any ratio to the other oxides on the basis of the porous support. However, the content of alumina is preferably 90 percent by mass or less, more preferably 60 percent by mass or less, more preferably 40 percent by mass or less, of the mass of the porous support.

Zeolite is a crystalline alumino silicate. Examples of the crystalline structure include faujasite, pentasil, and mordenite. These zeolites may be those ultra-stabilized by a specific hydrothermal treatment and/or acid treatment or those whose alumina content is adjusted. Preferred zeolites are those of faujasite, beta and mordenite types, and particularly preferred zeolites are those of Y and beta types. The zeolites of Y type are preferably ultra-stabilized. The ultra-stabilized zeolite have a micro porous structure peculiar thereto, so-called micro pores of 20 Å or smaller and also newly formed pores in the range of 20 to 100 Å. The hydrothermal treatment may be carried out under known conditions.

The active metal of the catalyst used for hydrotreating is at least one metal selected from the Group 8 metals of the periodic table, preferably at least one metal selected from Ru, Rh, Ir, Pd, and Pt, and more preferably Pd and/or Pt. These metals may be used in combination such as Pt—Pd, Pt—Rh, Pt—Ru, Ir—Pd, Ir—Rh, Ir—Ru, Pt—Pd—Rh, Pt—Rh—Ru, Ir—Pd—Rh, and Ir—Rh—Ru. The metal sources of these metals may be inorganic salts or complex salt compounds which have been conventionally used. The method of supporting the metal may be any of methods such as immersion and ion exchange which are used for a hydrogenation catalyst. When a plurality of metals are supported, they may be supported using a mixed solution thereof at the same time. Alternatively, a plurality of metals may be supported using solutions each containing any of the metals one after another. These metal solutions may be aqueous solutions or those produced using an organic solvent.

The metal(s) may be supported on the porous support after completion of all the steps for preparing the porous support. Alternatively, the metal(s) may be supported on the porous support in the form of a suitable oxide, complex oxide or zeolite produced at the intermediate stage of the preparation of the porous support and then may proceed to gel-preparation or be subjected to heat-concentration and kneading.

There is no particular restriction on the amount of the active metal(s) to be supported. However, the amount is from 0.1 to 10 percent by mass, preferably from 0.15 to 5 percent by mass, more preferably from 0.2 to 3 percent by mass on the basis of the catalyst mass.

The catalyst is preferably used after it is subjected to a pre-reduction treatment under a hydrogen stream. In general, the active metal(s) are subjected to heat at 200° C. or higher in accordance with the predetermined procedures, circulating gas containing hydrogen and then reduced, thereby exerting catalytic activity.

The petroleum base oil to be contained in the gas oil composition of the present invention has necessarily a 10% distillation temperature of 150° C. or higher and 250° C. or lower, a 90% distillation temperature of 210° C. or higher and 355° C. or lower and an end point of 365° C. or lower in distillation characteristics, a sulfur content of 10 ppm by mass or less, a total content of normal paraffins having 20 to 30 carbon atoms of less than 6 percent by mass, an aromatic content of 10 percent by volume or more and 60 percent by volume or less and a naphthene content of 10 percent by volume or more and 60 percent by volume or less.

The petroleum base oil to be contained in the gas oil composition may be used alone or a mixture of two or more types of these oils as long as they have the specific characteristics defined by the present invention.

If the petroleum base oil to be contained in the gas oil composition have distillation characteristics, a sulfur content, a total content of normal paraffins having 20 to 30 carbon atoms, an aromatic content, or a naphthene content, deviating from the above-described ranges, the resulting composition would be too low in oil solubility to obtain effects of additives and fail to achieve environment load reduction, excellent low temperature properties and low fuel consumption all together. Therefore, the petroleum base oil has preferably a 10% distillation temperature of 155° C. or higher and 245° C. or lower, a 90% distillation temperature of 215° C. or higher and 352° C. or lower and an end point of 362° C. or lower in distillation characteristics, a sulfur content of 9 ppm by mass or less, a total content of normal paraffins having 20 to 30 carbon atoms of 5.5 percent by mass or less, an aromatic content of 12 percent by volume or more and 58 percent by volume or less and a naphthene content of 12 percent by volume or more and 58 percent by volume or less, more preferably a 10% distillation temperature of 160° C. or higher and 240° C. or lower, a 90% distillation temperature of 220° C. or higher and 350° C. or lower and an end point of 360° C. or lower in distillation characteristics, a sulfur content of 8 ppm by mass or less, a total content of normal paraffins having 20 to 30 carbon atoms of 5 percent by mass or less, an aromatic content of 14 percent by volume or more and 56 percent by volume or less and a naphthene content of 14 percent by volume or more and 56 percent by volume or less.

The 10% distillation temperature, 90% distillation temperature and end point used herein denote the values measured in accordance with JIS K 2254 "Petroleum products-Determination of distillation characteristics". The sulfur content used herein denote the value measured in accordance with JIS K 2541 "Crude oil and petroleum products-Determination of sulfur content". The total content of normal paraffin having 20 to 30 carbon atoms (mass %) used herein denotes the value (mass %) measured with GC-FID, indicating the ratio of the total peak area of each of normal paraffins having 20 to 30 carbon atoms to the total peak area measured using GC-FID wherein the column is a capillary column formed of methyl silicone (ULTRA ALLOY-1), the carrier gas is helium and the detector is a flame ionization detector (FID), under conditions wherein the column length is 30 m, the carrier gas flow rate is 1.0 mL/min, the ratio of division is 1:79, the sample injection temperature is 360° C., the column is heated up from 140° C. to 355° C. (8° C./min), and the detector temperature is 360° C. The aromatic content used herein denotes the volume percentage (volume %) of the aromatic component content measured in accordance with JPI-5S-49-97 "Petroleum Products-Determination of Hydrocarbon Types-High Performance Liquid Chromatography" prescribed in JPI Standard and Manuals Testing Method for Petroleum Products published by Japan Petroleum Inst. The naphthene content used herein denotes the volume percentage (volume %) of the naphthene content measured in accordance with ASTM D2786 "Standard Test Method for Hydrocarbon Types Analysis of Gas-Oil Saturates Fractions by High Ionizing Voltage Mass Spectrometry".

To the gas oil composition of the present invention is necessarily added a cold flow improver comprising an ethylene vinyl acetate copolymer and/or a compound with a surface active effect in an amount of 20 mg/L or more and 1000 mg/L or less, preferably 300 mg/L or more and 800 mg/L or less in terms of the active component with the objective of preventing the filter of a diesel powered automobile from plugging.

The cold flow improver must be an ethylene-vinyl acetate copolymer and/or a compound with a surface active effect. Examples of the cold flow improver having a surface active effect include one or more types selected from copolymers of ethylene and methyl methacrylate, copolymers of ethylene and α-olefin, chlorinated methylene-vinyl acetate copolymers, alkyl ester copolymers of unsaturated carboxylic acids, eaters synthesized from nitrogen-containing compounds having a hydroxyl group and saturated fatty acids and salts of the esters, esters and amide derivatives synthesized from polyhydric alcohols and saturated fatty acids, esters synthesized from polyoxyalkylene glycol and saturated fatty acid, esters synthesized from alkyleneoxide adducts of polyhydric alcohols or partial esters thereof and saturated fatty acids, chlorinated paraffin/naphthalene condensates, alkenyl succiniamides, and amine salts of sulfobenzoic acids.

Other than the above-exemplified cold flow improvers, the gas oil composition of the present invention may contain any one or more type selected from alkenyl succinamides; linear compounds such as dibehenic acid esters of polyethylene glycols; polar nitrogen compounds composed of reaction products of acids such as phthalic acid, ethylenediaminetetraacetic acid and nitriloacetic acid or acid anhydride thereof and hydrocarbyl-substituted amines; and comb polymers composed of alkyl fumarates- or alkyl itaconates-unsaturated ester copolymers.

Since commercially available products referred to as cold flow improvers are often in the form in which the active components contributing to low-temperature fluidity (active components) are diluted with a suitable solvent. Therefore, the above amount of the cold flow improvers denotes the amount of the active components (active component concentration) when such commercially available products are added to the gas oil composition of the present invention.

The gas oil composition of the present invention necessarily contains mainly an FT synthetic base oil and/or a hydrotreated animal or vegetable oil, having specific characteristics, a petroleum base oil with specific characteristics and a specific cold flow improver and has the following specific characteristics.

That is, the gas oil composition has necessarily a cloud point of $-3°$ C. or lower, a cold filter plugging point of $-10°$ C. or lower, a value obtained by deducting the cold filter plugging point from the cloud point of $3°$ C. or higher, a pour point of $-12.5°$ C. or lower, a solubility index of 0 or greater, an aromatic content of 1 percent by volume or more and 15 percent by volume or less, a cetane number of 50 or greater and 80 or less, and an HFRR wear scar diameter (WS1.4) of 400 μm or smaller, and preferably has a density at $15°$ C. of 760 kg/cm$^3$ or greater and 840 kg/cm$^3$ or less, a 90% distillation temperature of $280°$ C. or higher and $350°$ C. or lower, a kinematic viscosity at $30°$ C. of 2.5 mm$^2$/s or greater and 5.0 mm$^2$/s or less and a water content of 100 ppm by mass or less.

The cloud point of the gas oil composition of the present invention is necessarily $-3°$ C. or lower, preferably $-4°$ C. or lower, more preferably $-5°$ C. or lower with the objective of securing low-temperature startability and drivability and maintaining the injection performance of an electronically controlled fuel injection pump. The cloud point used herein denotes the pour point measured in accordance with JIS K 2269 "Testing Method for Pour Point and Cloud Point of Crude Oil and Petroleum Products".

The cold filter plugging point of the gas oil composition of the present invention is necessarily $-10°$ C. or lower. Further, the cold filter plugging point is preferably $-11°$ C. or lower, more preferably $-12°$ C. or lower with the objective of preventing plugging of the pre-filter of a diesel powered automobile and maintaining the injection performance of an electronically controlled fuel injection pump. The cold filter plugging point used herein denotes the cold filter plugging point measured in accordance with JIS K 2288 "Gas oil-Determination of cold filter plugging point".

The value obtained by deducting the clod filter plugging point from the cloud point of the gas oil composition of the present invention is necessarily $3°$ C. or higher. Further, the value is preferably $5°$ C. or higher, more preferably $6°$ C. or higher with the objective of preventing plugging of the pre-filter of a diesel powered automobile and maintaining the injection performance of an electronically controlled fuel injection pump. The cloud point and cold filter plugging point used herein refer to the value in accordance with the foregoing JIS methods.

The pour point of the gas oil composition of the present invention is necessarily $-12.5°$ C. or lower. Further, the pour point is preferably $-15°$ C. or lower with the objective of securing low-temperature startability or drivability and maintaining the injection performance of an electronically controlled fuel injection pump. The pour point used herein denotes the pour point measured in accordance with JIS K 2269 "Testing Method for Pour Point and Cloud Point of Crude Oil and Petroleum Products".

The solubility index of the gas oil composition of the present invention is necessarily 0 or greater. The present invention is based on the premise that CFI or the like is used to enhance the low-temperature flowability of the gas oil. The reason for using CFI or the like is that the fuel, i.e., a solvent lacks solubility to additives. Therefore, as the result of study as to what characteristics should be applied to a gas oil to improve the solubility thereof, it was found through a statistic analysis that the characteristics can be determined by a solubility index defined by the following formula 1:

$$\text{Solubility index} = \text{aromatic content} \times 6 + \text{naphthene content} - \text{content of normal paraffins having 20 to 30 carbon atoms} \times 2 \quad \text{(formula 1).}$$

What is meant by this formula is that CFI to be added has easy-solubility with respect to aromatic components and naphthene component and on the other hand, heavy normal paraffins act as a factor to inhibit the gas oil from being dissolved. The degree at which these functions contribute can be statistically calculated from many experimental results, which are reflected in formula 1 above.

The solubility index is necessarily 0 or greater, preferably 2 or greater, more preferably 4 or greater with the objective of obtaining sufficient solubility to CFI and preventing the occurrence of regression phenomenon that substances once dissolved precipitate The aromatic content used herein denotes the volume percentage (volume %) of the aromatic component content measured in accordance with JPI-5S-49-97 "Petroleum Products-Determination of Hydrocarbon Types-High Performance Liquid Chromatography" prescribed in JPI Standard and Manuals Testing Method for Petroleum Products published by Japan Petroleum Inst. The naphthene content used herein denotes the volume percentage (volume %) of the naphthene content measured in accordance with ASTM D2786 "Standard Test Method for Hydrocarbon Types Analysis of Gas-Oil Saturates Fractions by High Ionizing Voltage Mass Spectrometry". The total content of normal paraffin having 20 to 30 carbon atoms (mass %) used herein denotes the value (mass %) measured with GC-FID, indicating the ratio of the total peak area of each of normal paraffins having 20 to 30 carbon atoms to the total peak area measured using GC-FID wherein the column is a capillary column formed of methyl silicone (ULTRA ALLOY-1), the carrier gas is helium and the detector is a flame ionization detector (FID), under conditions wherein the column length is 30 m, the carrier gas flow rate is 1.0 mL/min, the ratio of division is 1:79, the sample injection temperature is 360° C., the column is heated up from 140° C. to 355° C. (8° C./min), and the detector temperature is 360° C.

The aromatic content of the gas oil composition of the present invention is preferably 15 percent by volume or less, more preferably 10 percent by volume or less, more preferably 8 percent by volume or less. If the aromatic content is 15 percent by volume or less, the formation of PM or the like can be suppressed thereby enhancing the environment load reducing effects and the characteristics of the gas oil composition defined by the present invention can be easily achieved without fail. Further, the aromatic content is necessarily 1 percent by volume or more, preferably 2 percent by volume or more, more preferably 2.5 percent by volume or more with the objective of enhancing oil solubility.

The aromatic content used herein denotes the volume percentage (volume %) of the aromatic component content measured in accordance with JPI-5S-49-97 "Petroleum Products-Determination of Hydrocarbon Types-High Performance Liquid Chromatography" prescribed in JPI Standard and Manuals Testing Method for Petroleum Products published by Japan Petroleum Inst.

The cetane number is necessarily 50 or greater, preferably 60 or greater, more preferably 65 or greater with the objective of inhibiting knocking during diesel combustion and reducing the emissions of NOx, PM and aldehydes in the exhaust gas. With the objective of reducing black smoke in the exhaust gas, the cetane number is necessarily 80 or lower, preferably 75 or lower, more preferably 73 or lower. The cetane number used herein denotes the cetane number measured in accordance with "7. Cetane number test method" prescribed in JIS K 2280 "Petroleum products-Fuels-Determination of octane number, cetane number and calculation of cetane index".

The gas oil composition of the present invention have necessarily such a lubricity that the HFRR wear scar diameter (WS1.4) is 400 μm or smaller. If the lubricity is too low, the composition would cause a diesel engine equipped with a distribution type injection pump in particular to be increased in driving torque and in wear on each part of the pump while the engine is driven, possibly leading not only to degradation of the exhaust gas properties but also to the breakdown of the engine itself. Also in an electronically controlled fuel injection pump enabling a high pressure injection, wear on the sliding parts would likely occur. Therefore, with respect to the lubricity, the HFRR wear scar diameter (WS1.4) of the gas oil composition is necessarily 400 μm or smaller, preferably 390 μm or smaller, more preferably 380 μm or smaller. The lubricity, i.e., HFRR wear scar diameter (WS1.4) used herein denotes the lubricity measured in accordance with JPI-5S-50-98 "Gas oil-Testing Method for Lubricity" prescribed in JPI Standard and Manuals Testing Method for Petroleum Products published by Japan Petroleum Inst.

The density at 15° C. of the gas oil composition of the present invention is preferably 760 kg/m³ or higher, more preferably 765 kg/cm³ or higher, more preferably 770 kg/cm³ or higher with the objective of maintaining the calorific value. The density is preferably 840 kg/cm³ or lower, more preferably 835 kg/cm³ or lower, more preferably 830 kg/cm³ or lower with the objective of reducing NOx and PM emissions. The density used herein denotes the density measured in accordance with JIS K 2249 "Crude petroleum and petroleum products-Determination of density and petroleum measurement tables based on a reference temperature (15° C.)".

With regard to distillation characteristics, the 90% distillation temperature of the gas oil composition is necessarily 350° C. or lower. If the 90% distillation temperature is in excess of 350° C., the emissions of PM or fine particles would be likely increased. Therefore, the 90% distillation temperature is preferably 345° C. or lower, more preferably 340° C. or lower, more preferably 335° C. or lower. If the 90% distillation temperature is too low, it would induce deterioration of fuel consumption or reduction of engine output. Therefore, the lower limit 90% distillation temperature is preferably 280° C. or higher, more preferably 285° C. or higher, more preferably 290° C. or higher.

The initial boiling point of the gas oil composition of the present invention is preferably 140° C. or higher. If the initial boiling point is lower than 140° C., the engine output and high-temperature startability would tend to be reduced and deteriorated. Therefore, the initial boiling point is preferably 145° C. or higher, more preferably 150° C. or higher. The end point is preferably 360° C. or lower. If the end point is in excess of 360° C., the emissions of PM or fine particles would be likely increased. Therefore, the end point is preferably 365° C. or lower, more preferably 360° C. or lower.

The lower limit of 10% distillation temperature is preferably 160° C. or higher, more preferably 170° C. or higher, more preferably 180° C. or higher with the objective of suppressing reduction of engine output and deterioration of fuel consumption. The upper limit is preferably 250° C. or lower, more preferably 245° C. or lower, more preferably 230° C. or lower with the objective of suppressing deterioration of exhaust gas properties. The initial boiling point, 10% distillation temperature, 90% distillation temperature and end point used herein denote the values measured in accordance with JIS K 2254 "Petroleum products-Determination of distillation characteristics".

The kinematic viscosity at 30° C. of the gas oil composition of the present invention is preferably 2.5 mm²/s or higher, more preferably 2.55 mm²/s or higher, more preferably 2.6 mm²/s or higher. If the kinematic viscosity is lower than 2.5 mm²/s, it would be difficult to control the fuel injection timing at the fuel injection pump side, and lubricity at each part of the fuel injection pump installed in an engine would be reduced. There is no particular restriction on the upper limit kinematic viscosity at 30° C. However, the kinematic viscosity is preferably 5.0 mm²/s or lower, more preferably 4.8 mm²/s or lower, more preferably 4.5 mm²/s or lower with the objective of suppressing an increase in the NOx and PM concentrations in the exhaust gas, caused by destabilization of the fuel injection system due to an increase in resistance therein. The kinematic viscosity used herein denotes the value measured in accordance with JIS K 2283 "Crude petroleum and petroleum products-Determination of kinematic viscosity and calculation of viscosity index from kinematic viscosity".

The water content of the gas oil composition of the present invention is preferably 100 ppm by volume or less, more preferably 50 ppm by volume or less, more preferably 20 ppm by volume or less with the objective of preventing the compositions from freezing at lower temperatures and the engine interior from corroding. The water content used herein denotes the value measured in accordance with JIS K 2275 "Crude oil and petroleum products-Determination of water content-Potentiometric Karl Fischer titration method".

The sulfur content of the gas oil composition of the present invention is preferably 5 ppm by mass or less, more preferably 4 ppm by mass or less, more preferably 3 ppm by mass or less, with the objective of reducing poisonous substances exhausted from an engine and improving exhaust-gas post-processing system performances. The sulfur content used herein denotes the mass content of the sulfur components on the basis of the total mass of a gas oil composition measured in accordance with JIS K 2541 "Crude oil and petroleum products-Determination of sulfur content".

The total insoluble content of the gas oil composition of the present invention after an oxidation stability test is preferably 1.0 mg/100 mL or less, more preferably 0.8 mg/100 mL or less, more preferably 0.5 mg/100 mL or less in view or storage stability. The oxidation stability test used herein is carried out at a temperature of 95° C. under oxygen bubbling for 16 hours in accordance with ASTM D2274-94. The total insoluble content after an oxidation stability test referred herein denotes the value measured in accordance with the foregoing oxidation stability test.

The peroxide number of the gas oil composition of the present invention after an accelerated oxidation test (oxidation stability test) is preferably 50 ppm by mass or less, more preferably 40 ppm by mass or less, 30 ppm by mass or less in view of storage stability and compatibility to parts. The peroxide number after an accelerated oxidation test used herein denotes the value measured in accordance with JPI-5S-46-96 prescribed in JPI Standard after an accelerated oxidation test is carried out at a temperature of 95° C. under oxygen bubbling for 16 hours in accordance with ASTM D2274-94. If necessary, the gas oil compositions of the present invention may be blended with additives such as anti-oxidants or metal deactivators in order to reduce the peroxide number.

The flash point of the gas oil composition of the present invention is preferably 45° C. or higher. A flash point of lower than 45° C. is not preferable in view of safety. Therefore, the flash point is preferably 47° C. or higher, more preferably 50° C. or higher. The flash point used herein denotes the value measured in accordance with JIS K 2265 "Crude oil and petroleum products-Determination of flash point".

There is no particular restriction on the carbon residue of the 10% distillation residue of the gas oil composition of the present invention. However, the carbon residue of the 10% distillation residue is preferably 0.1 percent by mass or less, more preferably 0.08 percent by mass or less, more preferably 0.05 percent by mass or less with the objective of reducing fine particles and PM, maintaining the performances of the exhaust-gas post-processing system installed in an engine and preventing sludge from plugging a filter. The carbon residue of the 10% distillation residue used herein denotes that measured in accordance with JIS K 2270 "Crude petroleum and petroleum products-Determination of carbon residue".

There is no particular restriction on the naphthene compound content of the gas oil composition of the present invention as long as the solubility index falls within the above-described range. However, the naphthene compound content is preferably 15 percent by volume or less, more preferably 12 percent by volume or less, more preferably 10 percent by volume or less in view of adverse affect to the exhaust gas properties.

The naphthene compound content used herein denotes the volume percentage (volume %) of the naphthene content measured in accordance with ASTM D2786 "Standard Test Method for Hydrocarbon Types Analysis of Gas-Oil Saturates Fractions by High Ionizing Voltage Mass Spectrometry".

There is no particular restriction on addition of additives other than the above-described cold flow improver comprising an ethylene vinyl acetate copolymer and/or a compound with a surface active effect. If necessary, a lubricity improver may be added. With the objective of preventing a fuel injection pump from wearing, the amount of the lubricity improver is preferably 20 mg/L or more and 300 mg/L or less, preferably 50 mg/L or more and 200 mg/L or less, in terms of active component concentration. When the lubricity improver is blended in an amount within these ranges, the lubricity improver can effectively exhibit its efficacy. For example, in a diesel engine equipped with a distribution type injection pump, the lubricity improver can suppress the driving torque from increasing and can reduce wear on each part of the pump while the engine is driven.

The lubricity improvers must be those of type containing a compound with a polar group, comprising a fatty acid and/or a fatty acid ester. There is no particular restriction on the specific name of the compound. The lubricity improver may, therefore, be any one or more types selected from carboxylic acid-, ester-, alcohol- and phenol-based lubricity improvers. Among these lubricity improvers, preferred are carboxylic acid- and ester-based lubricity improvers. The carboxylic acid-based lubricity improver may be linoleic acid, oleic acid, salicylic acid, palmitic acid, myristic acid or hexadecenoic acid or a mixture of two or more of these carboxylic acids. Examples of the ester-based lubricity improver include carboxylic acid esters of glycerin. The carboxylic acid forming the carboxylic acid ester may be of one or more types. Specific examples of the carboxylic acid include linoleic acid, oleic acid, salicylic acid, palmitic acid, myristic acid or hexadecenoic acid.

To the gas oil composition of the present invention may be added a detergent if necessary. However, it is necessary that the detergent is added after addition of the lubricity improver and before addition of the cold flow improver, or simultaneously with addition of the lubricity improver. There is no particular restriction on the components of the detergent. Examples of the detergents include ashless dispersants, for example, polyether amine compounds which are reactions products of butyleneoxide and amine; polybutenyl amine compounds which are reaction products of isobutylene copolymers and amine; imide compounds; alkenyl succinimides such as polybutenyl succinimide synthesized from polybutenyl succinic anhydride and ethylene polyamines; succinic acid esters such as polybutenyl succinic acid ester synthesized from polyhydric alcohols such as pentaerythritol and polybutenyl succinic anhydride; copolymerized polymers such as copolymers of dialkylaminoethyl methacrylates, polyethylene glycol methacrylates, or vinylpyrrolidon and alkylmethacrylates; and reaction products of carboxylic acids and amines. Among these, preferred are alkenyl succinimides and reaction products of carboxylic acids and amines. These detergents may be used alone or in combination. When an alkenyl succinimide is used, an alkenyl succinimide having a molecular weight of 1000 to 3000 may be used alone, or an alkenyl succinimide having a molecular weight of 700 to 2000 and an alkenyl succinimide having a molecular weight of 10000 to 20000 may be used in combination. Carboxylic acids constituting reaction products of carboxylic acids and amines may be of one or more types. Specific examples of the carboxylic acids include fatty acids having 12 to 24 carbon atoms and aromatic carboxylic acids having 7 to 24 carbon atoms. Examples of fatty acids having 12 to 24 carbon atoms include, but not limited thereto, linoleic acid, oleic acid, palmitic acid, and myristic acid. Examples of aromatic carboxylic acids having 7 to 24 carbon atoms include, but not limited thereto, benzoic acid and salicylic acid. Amines constituting reaction products of carboxylic acids and amines may be of one or more types. Typical examples of amines used herein include, but not limited thereto, oleic amines. Various amines may also be used.

There is no particular restriction on the amount of the detergent to be blended. However, the amount is preferably 20 mg/L or more, more preferably 50 mg/L or more, more preferably 100 mg/L or more, on the basis of the total mass of the composition, because the detergent can perform its effect to suppress a fuel injection nozzle from plugging. The effect may not be obtained if the amount is less than 20 mg/L. On the other hand, if the detergent is blended in a too much amount, its effect as balanced with the amount is not obtained. Therefore, the amount of the detergent is preferably 500 mg/L or less, more preferably 300 mg/L or less, more preferably 200 mg/L or less because the detergent may increase the amounts of NOx, PM and aldehydes in the exhaust gas from a diesel engine. Commercial available detergents are generally available in a state wherein the active component contributing to detergency is diluted with a suitable solvent. In the case where such products are blended with the gas oil compositions of the present invention, the content of the active component is preferably within the above-described range.

If necessary, the gas oil compositions of the present invention may be blended with a cetane number improver in a suitable amount to enhance the cetane number of the composition.

The cetane number improver may be any of various compounds known as cetane number improvers for gas oil. Examples of such cetane number improvers include nitrate esters and organic peroxides. These cetane number improvers may be used alone or in combination. Preferred for use in the present invention are nitrate esters. Examples of the nitrate esters include various nitrates such as 2-chloroethyl nitrate, 2-ethoxyethyl nitrate, isopropyl nitrate, butyl nitrate, primary amyl nitrate, secondary amyl nitrate, isoamyl nitrate, primary hexyl nitrate, secondary hexyl nitrate, n-heptyl nitrate, n-octyl nitrate, 2-ethylhexyl nitrate, cyclohexyl nitrate, and ethylene glycol dinitrate. Particularly preferred are alkyl nitrates having 6 to 8 carbon atoms.

The content of the cetane number improver is preferably 500 mg/L or more, more preferably 600 mg/L or more, more preferably 700 mg/L or more, more preferably 800 mg/L or more, most preferably 900 mg/L or more. If the content of the cetane number improver is less than 500 mg/L, the cetane number improving effect may not be attained sufficiently, leading to a tendency that PM, aldehydes, and NOx in the exhaust gas from a diesel engine are not reduced sufficiently. There is no particular restriction on the upper limit content of the cetane number improver. However, the upper limit is preferably 1400 mg/L or less, more preferably 1250 mg/L or less, more preferably 1100 mg/L or less, and most preferably 1000 mg/L or less, on the basis of the total mass of the gas oil composition.

The cetane number improver may be any of those synthesized in accordance with conventional methods or commercially available products. Such products in the name of cetane number improver are available in a state wherein the active component contributing to an improvement in cetane number (i.e., cetane number improver itself) is diluted with a suitable solvent. In the case where the gas oil composition of the present invention is prepared using any of such commercially available products, the content of the effective component is preferably within the above-described range.

In order to further enhance the properties of the gas oil compositions of the present invention, other known fuel oil additives (hereinafter referred to as "other additives" for convenience) may be used alone or in combination. Examples of the other additives include phenolic- and aminic anti-oxidants; metal deactivators such as salicyliden derivatives; anti-corrosion agents such as aliphatic amines and alkenyl succinic acid esters; anti-static additives such as anionic, cationic, and amphoteric surface active agents; coloring agents such as azo dye; silicone-based defoaming agents and anti-icing agents such as 2-methoxyethanol, isopropyl alcohol and polyglycol ethers.

The amounts of the other additives may be arbitrarily selected. However, the amount of each of the other additives is preferably 0.5 percent by mass or less, more preferably 0.2 percent by mass or less, on the basis of the total mass of the composition.

As described above, according to the present invention, the use of the gas oil composition with specific characteristics produced in accordance with the above-described blend ratio of the base oils and method of blending additives renders it possible to produce easily a gas oil composition suitable for a winter season that can achieve environment load reduction, excellent low-temperature properties and low fuel consumption all together, which have been difficult to achieve with the conventional gas oil compositions even though the gas oil composition of the present invention contains mainly an FT synthetic base oil and/or a hydrotreated animal or vegetable oil.

There is no particular restriction on the specifications, application and environment of use of a diesel engine in which the gas oil composition of the present invention is used.

APPLICABILITY IN THE INDUSTRY

The present invention can provide a gas oil composition suitable for a winter season that can achieve environment load reduction, excellent low-temperature performance and low fuel consumption all together.

EXAMPLES

Hereinafter, the present invention will be described in more detail by way of the following examples and comparative examples, which should not be construed as limiting the scope of the invention.

The characteristics of gas oil compositions were measured by the following methods.

The density referred herein denotes the density measured in accordance with JIS K 2249 "Crude petroleum and petroleum products-Determination of density and petroleum measurement tables based on a reference temperature (15° C.)".

The kinematic viscosity referred herein denotes the viscosity measured in accordance with JIS K 2283 "Crude petroleum and petroleum products-Determination of kinematic viscosity and calculation of viscosity index from kinematic viscosity".

The flash point referred herein denotes the value measured in accordance with JIS K 2265 "Crude oil and petroleum products-Determination of flash point".

The sulfur content referred herein denotes the mass content of the sulfur components on the basis of the total mass of the composition, measured in accordance with JIS K 2541 "Crude oil and petroleum products-Determination of sulfur content".

The oxygen content referred herein denotes the value measured with a thermal conductivity detector after the samples were converted to CO or alternatively further to $CO_2$, on platinum carbon.

All of the distillation characteristics referred herein denotes the values measured in accordance with JIS K 2254 "Petroleum products-Determination of distillation characteristics".

The cetane index and cetane number referred herein denote the values calculated in accordance with "8.4 cetane number calculation method using variables equation" prescribed in JIS K 2280 "Petroleum products-Fuels-Determination of octane number, cetane number and calculation of cetane number".

The content of normal paraffins having 20 to 30 carbon atoms (C20-C30 normal paraffins, mass %) referred herein denotes the value (mass %) measured with GC-FID, indicating the ratio of the total peak area of each of normal paraffins having 20 to 30 carbon atoms to the total peak area measured using GC-FID wherein the column is a capillary column formed of methyl silicone (ULTRA ALLOY-1), the carrier gas is helium and the detector is a flame ionization detector (FID), under conditions wherein the column length is 30 m, the carrier gas flow rate is 1.0 mL/min, the ratio of division is 1:79, the sample injection temperature is 360° C., the column is heated up from 140° C. to 355° C. (8° C./min), and the detector temperature is 360° C.

The aromatic content referred herein denotes the volume percentage (volume %) of the aromatic component content measured in accordance with JPI-5S-49-97 "Petroleum Products-Determination of Hydrocarbon Types-High Performance Liquid Chromatography" prescribed in JPI Standard and Manuals Testing Method for Petroleum Products published by Japan Petroleum Inst.

The naphthene content referred herein denotes the volume percentage (volume %) of the naphthene content measured in accordance with ASTM D2786 "Standard Test Method for Hydrocarbon Types Analysis of Gas-Oil Saturates Fractions by High Ionizing Voltage Mass Spectrometry".

The solubility index referred herein denotes the value calculated from the above-described formula 1.

The cloud point referred herein denotes that measured in accordance with JIS K 2269 "Testing Method for Pour Point and Cloud Point of Crude Oil and Petroleum Products".

The cold filter plugging point referred herein denotes that measured in accordance with JIS K 2288 "Gas oil-Determination of cold filter plugging point".

The cloud point-cold filter plugging point referred herein denotes the value obtained by deducting cold filter plugging point from cloud point.

The pour point referred herein denotes that measured in accordance with JIS K 2269 "Testing Method for Pour Point and Cloud Point of Crude Oil and Petroleum Products".

The lubricity, i.e., HFRR wear scar diameter (WS1.4) referred herein denotes lubricity measured in accordance with JPI-5S-50-98 "Gas oil-Testing Method for Lubricity" prescribed in JPI Standard and Manuals Testing Method for Petroleum Products published by Japan Petroleum Inst.

The carbon residue content of the 10% distillation residue referred herein denotes that measured in accordance with JIS K 2270 "Crude petroleum and petroleum products-Determination of carbon residue".

The peroxide number after an oxidation stability test referred herein denotes the value measured in accordance with JPI-5S-46-96 prescribed in JPI Standard and Manuals Testing Method for Petroleum Products published by Japan Petroleum Inst after the compositions are subjected to an accelerated oxidation at a temperature of 95° C. under oxygen bubbling for 16 hours in accordance with ASTM D2274-94.

The insoluble content after an oxidation stability test referred herein denotes the value measured after the compositions are subjected to an accelerated oxidation at a temperature of 95° C. under oxygen bubbling for 16 hours in accordance with ASTM D2274-94.

The water content referred herein denotes that measured in accordance with JIS K 2275 "Crude oil and petroleum products-Determination of water content-Potentiometric Karl Fischer titration method".

Examples 1 and 2, and Comparative Examples 1 and 2

The gas oil compositions of Examples 1 and 2 and Comparative Examples 1 and 2 were produced by blending FT synthetic base oils and a hydrotreated animal or vegetable oil, both having properties as set forth in Table 2 and petroleum base oils having properties as set forth in Table 3 at blend ratios set forth in Table 4. FT synthetic base oils 1 and 2 are hydrocarbon mixtures produced by converting natural gas to wax or a middle fraction through FT reaction, followed by hydrotreating. The reaction conditions for each FT synthetic base oil varied. FT synthetic base oil 1 is a base oil produced by isomerization positively carried out. FT synthetic base oil 2 is a base oil resulting from a treatment wherein too much emphasis was not placed on isomerization. The highly hydrotreated base oil is a hydrocarbon base oil produced by further hydrotreating a gas oil base oil to further reduce the sulfur and aromatic contents. The hydrotreated animal or vegetable oil is an oil produced by hydrotreating palm oil (whole component) used as the raw material to remove the foreign substance. The hydrorefined gas oil corresponds to a commercially available JIS No. 2 gas oil which is used in a winter season. The gas oil compositions of Examples 1 and 2 and Comparative Example 1 were produced by blending these base oils in suitable amounts or using any of the base oils as the whole.

The additives used in these examples are as follows:

Lubricity improver: Infineum R 655 manufactured by Infineum Japan Ltd. (active component: straight-chain alkylester mixture containing a fatty acid as the raw material, average molecular weight: 250 MW)

Detergent: alkenyl succinimide mixture

Cold flow improver: Infineum R240 manufactured by Infineum Japan Ltd. (active component: ethylene-vinyl acetate copolymer mixture, solvent: alkylbenzene) (melting point: −50° C. or lower)

Table 4 sets forth the blend ratio of the gas oil compositions thus prepared and the 15° C. density, 30° C. kinematic viscosity, flash point, sulfur content, oxygen content, distillation characteristics, cetane index, cetane number, content of normal paraffins having 20 to 30 carbon atoms (C20-C30 normal paraffins) aromatic content, naphthene content, solubility index, cloud point, cold filter plugging point, cloud point-cold filter plugging point, pour point, wear scar diameter, carbon residue content of the 10% distillation residue, total insoluble content and peroxide number after an oxidation stability test, and water content of each composition.

As apparent from Tables 2 to 4, the gas oil compositions used in the examples were produced by blending FT synthetic base oils and/or a hydrotreated animal or vegetable oil, and petroleum base oils at specific blend ratios. Further, as apparent from Table 4, gas oil compositions satisfying the characteristics as defined herein were easily produced without fail, in Examples 1 and 2 wherein the FT synthetic base oils and/or a hydrotreated animal or vegetable oil, and petroleum base oils were blended within the range defined herein. On the other hand, as apparent from Comparative Example 1 wherein the composition was produced by blending an FT synthetic base oil and a petroleum base oil, both of which do not have the characteristics defined by the present invention and Comparative Example 2 wherein the composition comprised a base oil containing an FT synthetic oil only, they failed to produce the gas oil composition having the characteristics as intended by the present invention.

Various tests were carried out using the gas oil compositions of Examples 1 and 2 and Comparative Examples 1 and 2. All the results are set forth in Table 5. As apparent from the results set forth in Table 5, the gas oil compositions of Examples 1 and 2 were excellent in fuel consumption and low-temperature startability and had excellent environment load reduction properties, compared with those of Comparative Examples 1 and 2. Therefore, the compositions of Examples 1 and 2 are high-quality fuels that can achieve excellent fuel consumptions and low-temperature startability all together at a high level under winter environments, which are difficult to achieve with the conventional gas oil compositions.

(Diesel Combustion Test)

A vehicle 1 was driven using each gas oil composition under a test mode shown in FIG. 1 to measure NOx, smoke and fuel consumption. The results obtained using the fuel in Comparative Example 1 were defined as 100, and the results of the other fuels were relatively evaluated by comparison with the results of Comparative Example 1 (smaller values indicate better results).

(Low-Temperature Startability Test)

Using the vehicle 1 and on a chassis dynamometer capable of controlling the environment temperature, each of the gas oil compositions was subjected to a test carried out at room temperature by (1) flashing (washing) the fuel system of a test diesel vehicle with a fuel to be evaluated; (2) draining out the flashing fuel; (3) replacing the main filter with new one; and (4) feeding the fuel tank with the fuel to be evaluated in a specific amount (½ of the tank volume of the test vehicle). The test was continued by (5) cooling rapidly the environment temperature from room temperature to −15° C.; (6) keeping the temperature at −15° C. for one hour; (7) cooling gradually at a rate of 1° C./h till reaching to the predetermined temperature (−25° C.); and (8) starting the engine after the temperature was kept at the predetermined temperature for one hour. If the engine did not start even after 10 second cranking was repeated twice at an interval of 30 seconds, the fuel was evaluated as "Not passed" at this moment. If the engine started while 10 second cranking was repeated twice at an interval of 30 seconds, it was idled for 3 minutes and then the vehicle was speeded up to 60 km/h over 15 seconds and driven at the low speed. When defects in operation (hunting, stumble, vehicle speed reduction or engine stop) were observed while the vehicle was speeded up to 60 km/h and driven at that speed for 20 minutes, the gas oil composition was evaluated as "Not passed" at this moment. If the engine ran until the end without any defect, the gas oil composition was evaluated as "Passed".

(Vehicle specification): Vehicle 1
    Type of engine: in-line 4 cylinder intercooled supercharged diesel engine with EGR
    Displacement: 1.4 L
    Internal diameter×stroke: 73 mm×81.4 mm
    Compression ratio: 18.5 (altered to 16.0)
    Maximum output: 72 kW/4000 rpm
    Adopted regulation: 2002 Exhaust Gas Emission Regulation
    Vehicle weight: 1060 kg
    Transmission: 5-speed manual transmission
    Exhaust-gas post-processing device: oxidation catalyst

TABLE 1

| Items | Specification |
|---|---|
| GC Model | HP-6890 |
| Column | FFAP($\phi$ 0.32 mm × 25 m) |
| Carr. Gas | He (26 psi) |
| Detector | FID |
| Inj. Temp | 280° C. |
| Det. Temp | 300° C. |
| Oven Temp | 100° C.~260° C. |
| Temp Rate | 5° C./min |
| Inj. Vol. | 0.2 µL(toluene solution) |

TABLE 2

|  | FT synthetic base oil 1 | FT synthetic base oil 1 | Hydrotreated animal or vegetable oil |
|---|---|---|---|
| Density (15° C.) kg/m$^3$ | 786 | 796 | 781 |
| Kinematic viscosity (30° C.) mm$^2$/s | 3.6 | 3.6 | 3.4 |
| Distillation characteristics ° C.  10% distillation temperature | 199.5 | 231.0 | 226.5 |
| 50% distillation temperature | 275.5 | 301.0 | 279.5 |
| 90% distillation temperature | 329.5 | 341.0 | 310.0 |
| End point | 358.5 | 369.0 | 329.5 |
| Sulfur content mass % | <1 | 2.0 | <1 |
| C20-C30 Normal paraffins mass % | 6.7 | 9.0 | <1 |
| Higher aliphatic alcohol mass ppm | <1 | 112 | <1 |

TABLE 3

|  | Petroleum base oil 1 | Petroleum base oil 2 | Petroleum base oil 3 |
|---|---|---|---|
| Density (15° C.) kg/m$^3$ | 830 | 865 | 829 |
| Kinematic viscosity(30° C.) mm$^2$/s | 4.3 | 3.8 | 10.2 |
| Distillation characteristics ° C.  10% distillation temperature | 225.0 | 232.0 | 256.0 |
| 50% distillation temperature | 293.0 | 271.0 | 256.5 |
| 90% distillation temperature | 345.0 | 348.5 | 356.0 |
| End point | 359.0 | 359.0 | 371.0 |
| Sulfur content mass % | 7 | 9 | 15 |
| C20-C30 Normal paraffins mass % | 4.2 | 5.5 | 8.9 |

TABLE 3-continued

| | Petroleum base oil 1 | Petroleum base oil 2 | Petroleum base oil 3 |
|---|---|---|---|
| Aromatic content vol. % | 18.2 | 58.7 | 5.2 |
| Naphthene content vol. % | 28.8 | 15.2 | 7.8 |

TABLE 4

| | | Example 1 | Example 2 | Comparative Example 1 | Comparative Example 2 |
|---|---|---|---|---|---|
| FT synthetic base oil 1 | | 80 | 75 | | 100 |
| FT synthetic base oil 2 | | | | 60 | |
| Hydrotreatd animal or vegetable oil | | | 20 | | |
| Petroleum base oil 1 | | 20 | | | |
| Petroleum base oil 2 | | | 5 | | |
| Petroleum base oil 3 | | | | 40 | |
| Density | (15° C.) kg/m³ | 795 | 789 | 809 | 786 |
| Kinematic viscosity | (30° C.) mm²/s | 3.7 | 3.6 | 6.2 | 3.7 |
| Flash point | ° C. | 76 | 75 | 87 | 64 |
| Sulfur content | mass ppm | 1 | 1 | 6 | <1 |
| Oxygen content | mass % | <0.1 | <0.1 | 0.2 | <0.1 |
| Distillation characteristics ° C. | Initial boiling point | 190.0 | 205.0 | 204.0 | 181.0 |
| | 10% distillation temperature | 204.5 | 213.0 | 229.0 | 199.5 |
| | 50% distillation temperature | 283.0 | 289.0 | 293.0 | 275.5 |
| | 90% distillation temperature | 334.0 | 339.0 | 348.0 | 329.5 |
| | End point | 359.0 | 358.5 | 369.0 | 358.5 |
| Cetane index | | 76.1 | 82.1 | 72.1 | 78.9 |
| Cetane number | | 67.8 | 72.2 | 73.4 | 81.5 |
| C20-C30 Normal paraffins | mass % | 6.2 | 7.0 | 9.0 | 9.0 |
| Aromatic content | vol. % | 3.6 | 2.9 | 2.4 | 0.1 |
| Naphthene content | vol. % | 5.8 | 0.8 | 3.0 | 0.1 |
| Solubility index | | 15.2 | 4.2 | −0.5 | −17.3 |
| Cloud point | ° C. | −5 | −6 | −3 | −2 |
| Plugging point | ° C. | −12 | −13 | −5 | −4 |
| Cloud point − Plugging point | | 7 | 7 | 2 | 2 |
| Pour point | ° C. | −15.0 | −15.0 | −5.0 | −7.5 |
| HFRR Wear scar diameter (WS1.4) | μm | 360 | 380 | 460 | 480 |
| Carbon residue content of 10% distillation residue | mass % | 0.00 | 0.00 | 0.00 | 0.00 |
| Peroxide number | mass ppm | 1 | 14 | 2 | 3 |
| Insoluble content | mg/100 mL | 0.1 | 0.2 | 0.7 | 0.2 |
| Water content | vol. ppm | 25 | 19 | 47 | 23 |
| Lubricity improver | mg/L | 150 | 150 | — | — |
| Detergent | mg/L | — | 100 | — | — |
| Cold flow improver | mg/L | 150 | 150 | 150 | — |
| Cetane number improve | mg/L | — | — | — | — |

TABLE 5

| | | Example 1 | Example 2 | Comparative Example 1 | Comparative Example 2 |
|---|---|---|---|---|---|
| Fuel consumption properties | | 98 | 99 | 100 | 101 |
| Vehicle exhaust gas | NOx | 96 | 98 | 100 | 98 |
| | Smoke | 91 | 91 | 100 | 99 |
| Low-temperature startability | −10° C. | Paased | Passed | Not passed | Not passed |

BRIEF DESCRIPTION OF THE DRAWING

FIG. 1 shows transient driving mode simulating actual running.

The invention claimed is:

1. A gas oil composition comprising on the basis of the total mass of the composition:
an FT synthetic base oil and/or a hydrotreated animal or vegetable oil in an amount of 70 percent by volume or more to 98 percent by volume or less;
a petroleum base oil in an amount of 2 percent by volume or more to 30 percent by volume or less; and
a cold flow improver comprising an ethylene vinyl acetate copolymer and/or a compound with a surface active effect in an amount of 20 mg/L or more and 1000 mg/L or lower in terms of active component,
the FT synthetic base oil and/or the hydrotreated animal or vegetable oil, having a 10% distillation temperature of 160° C. or higher and 230° C. or lower, a 90% distillation temperature of 280° C. or higher and 340° C. or lower and an end point of 360° C. or lower in distillation characteristics, an higher aliphatic alcohol content of 100 ppm by mass or less, a sulfur content of 1 ppm by mass or less and a total content of normal paraffins having 20 to 30 carbon atoms of less than 8 percent by mass;
the petroleum base oil having a 10% distillation temperature of 150° C. or higher and 250° C. or lower, a 90% distillation temperature of 345° C. or higher and 355° C. or lower and an end point of 365° C. or lower in distillation characteristics, a sulfur content of 10 ppm by mass or less, a total content of normal paraffins having 20 to 30 carbon atoms of less than 6 percent by mass, an aromatic content of 10 percent by volume or more and 60 percent by volume or less and a naphthene content of 10 percent by volume or more and 60 percent by volume or less;

the composition having a cloud point of −3° C. or lower, a cold filter plugging point of −10° C. or lower, a value obtained by deducting the cold filter plugging point from the cloud point of 3° C. or higher, a pour point of −12.5° C. or lower, a solubility index of 0 or greater, an aromatic content of 1 percent by volume or more and 15 percent by volume or less, a cetane number of 50 or greater and 80 or less, a kinematic viscosity at 30° C. of 3.6 mm$^2$/s or higher and 5.0 mm$^2$/s or lower, and an HFRR wear scar diameter (WS1.4) of 400 m or smaller.

2. The gas oil composition according to claim 1, wherein the composition has a density at 15° C. of 760 kg/m$^3$ or greater and 840 kg/m$^3$ or less, a 90% distillation temperature of 280° C. or higher and 350° C. or lower, and a water content of 100 ppm by volume or less.

* * * * *